(12) United States Patent
Obata et al.

(10) Patent No.: US 12,252,197 B2
(45) Date of Patent: Mar. 18, 2025

(54) STEERING DEVICE FOR VEHICLE

(71) Applicant: HONDA MOTOR CO., LTD., Tokyo (JP)

(72) Inventors: Isao Obata, Saitama (JP); Hisashi Ishimatsu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 503 days.

(21) Appl. No.: 17/678,248

(22) Filed: Feb. 23, 2022

(65) Prior Publication Data
US 2022/0306191 A1 Sep. 29, 2022

(30) Foreign Application Priority Data

Mar. 26, 2021 (JP) ................. 2021-052743

(51) Int. Cl.
*B62D 6/02* (2006.01)
*B62D 1/04* (2006.01)
*B62D 5/00* (2006.01)

(52) U.S. Cl.
CPC ............... *B62D 6/02* (2013.01); *B62D 1/04* (2013.01); *B62D 5/005* (2013.01)

(58) Field of Classification Search
CPC . B62D 6/02; B62D 1/04; B62D 5/005; B62D 6/002; B62D 15/021; B62D 5/04
USPC ........................................................ 180/446
See application file for complete search history.

(56) References Cited

U.S. PATENT DOCUMENTS 6,662,898 B1 * 12/2003 Mattson .................... B62D 6/04
180/443
2020/0307674 A1 * 10/2020 Morino ................ B62D 15/021

FOREIGN PATENT DOCUMENTS

| JP | 2007326497 A | 12/2007 |
| JP | 2011251640 A | 12/2011 |
| JP | 2015123864 A | 7/2015 |
| JP | 2020062949 A | 4/2020 |
| JP | 2020157833 A | 10/2020 |
| WO | 2019229205 A | 12/2019 |

OTHER PUBLICATIONS

Notice of Reasons for Refusal for Japanese Patent Application No. 2021-052743 dated Nov. 8, 2022; 5 pp.
Office Action for Chinese Patent Application 202210167339.5, mailed Sep. 20, 2023; 7 pp.

* cited by examiner

*Primary Examiner* — Scott A Reinbold
(74) *Attorney, Agent, or Firm* — Armstrong Teasdale LLP

(57) ABSTRACT

A steering device for a vehicle includes: an operation member configured to be operated by a driver; a turning member mechanically separated from the operation member and configured to turn a wheel; a turning device configured to drive the turning member; and a controller configured to control the turning device, wherein the controller has: a first control mode in which a maximum turning angle of the wheel is set to a first angle corresponding to a maximum angle for mechanically turning the wheel; and a second control mode in which the maximum turning angle of the wheel is set to a second angle that is smaller than the first angle; and the controller is configured to switch between the first control mode and the second control mode based on a current travel condition of an own vehicle detected by a travel condition detecting unit.

5 Claims, 4 Drawing Sheets

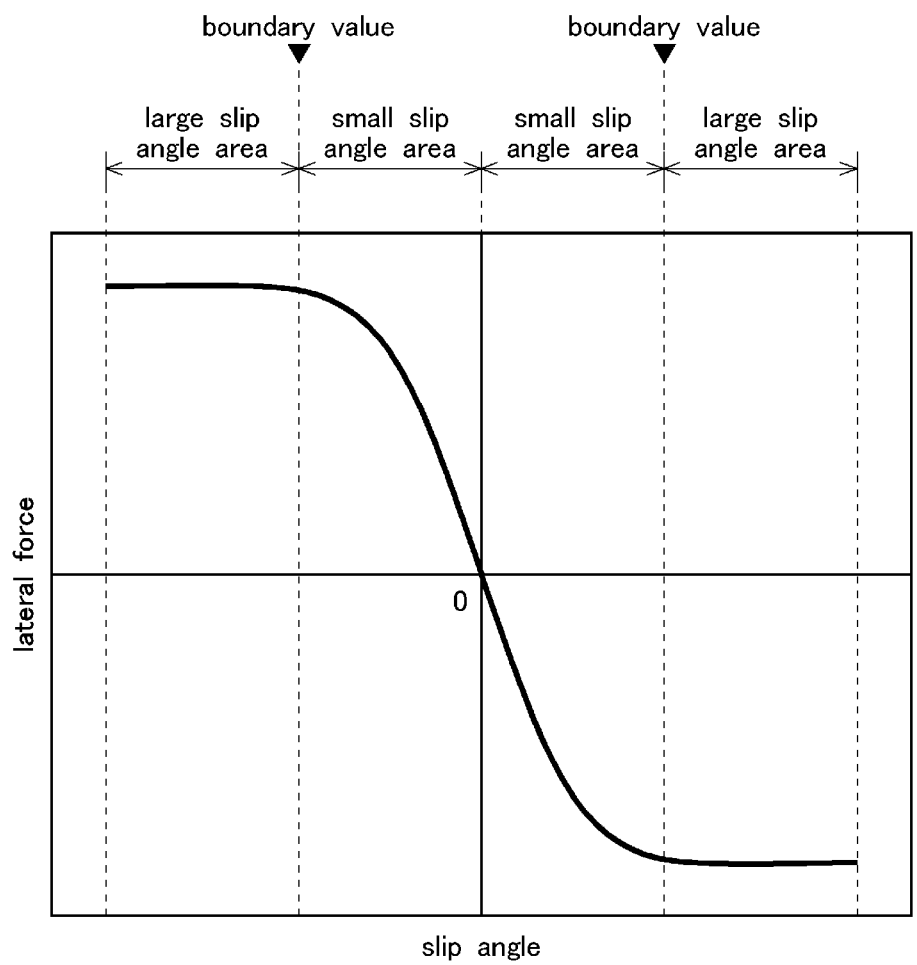

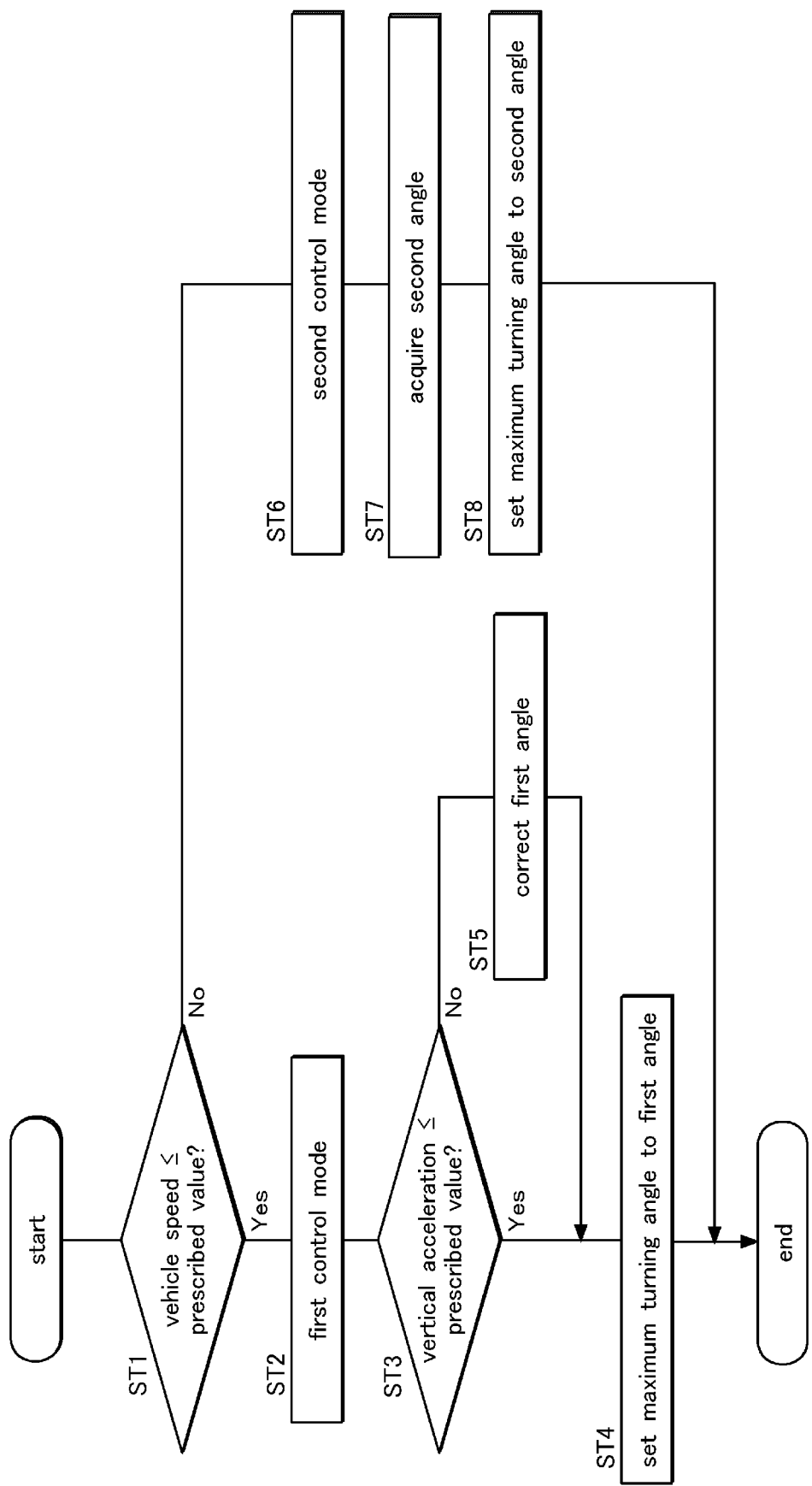

STEERING DEVICE FOR VEHICLE

TECHNICAL FIELD

The present invention relates to a steer-by-wire steering device provided in a vehicle.

BACKGROUND ART

A steer-by-wire steering device is configured such that a steering wheel operated by a driver and a rack shaft that turns a wheel are mechanically separated, a steering angle sensor detects a steering angle of the steering wheel, and a turning actuator turns the wheel according to the steering angle.

Conventionally, in a general rack-and-pinion steering device, a maximum turning angle of the wheel is determined by a position where the rack shaft is mechanically restricted. On the other hand, in the steer-by-wire steering device, the steering wheel and the rack shaft are not mechanically connected, and thus the steering angle of the steering wheel is not mechanically restricted.

Accordingly, the steer-by-wire steering device can perform control differently from the rack-and-pinion steering device. For example, a known technique prompts a driver to return a steering wheel by making reaction force applied to the steering wheel larger than usual in a case where a steering angle of the steering wheel keeps on matching an angle corresponding to a rack end position (a position where the movement of a rack is mechanically restricted) for a prescribed period or more (see JP2011-251640A).

By the way, when designing a suspension and its periphery of a vehicle, it is necessary to leave a prescribed clearance between a wheel and a member on a side of a vehicle body (for example, a frame or a suspension; hereinafter referred to as "vehicle body side member") so that the wheel does not interfere with the vehicle body side member even if the wheel goes into in a maximum turning state (a state where the wheel is turned to a maximum turning angle) and the suspension goes into a large stroke state (a state where the stroke amount of the suspension becomes large). More specifically, the interference between the wheel and the vehicle body side member is prevented by a recess formed on the vehicle body side member. However, when such a method is adopted, tight restrictions are imposed on the cross-sectional shape of the vehicle body side member, which may reduce the design flexibility of the vehicle body side member.

On the other hand, in the steer-by-wire steering device, the maximum turning angle of the wheel can be flexibly set regardless of the mechanical structure of the steering device as long as the maximum turning angle of the wheel as a parameter of steering control is set such that the wheel does not interfere with the vehicle body side member. Accordingly, in the steer-by-wire steering device, it is desirable to enhance the design flexibility of the vehicle body side member such as a suspension by relaxing structural restrictions for preventing interference between the wheel and the vehicle body side member.

SUMMARY OF THE INVENTION

In view of the above background, an object of the present invention is to provide a steer-by-wire steering device for a vehicle that can prevent the interference between the wheel and the vehicle body side member and enhance the design flexibility of the vehicle body side member such as a suspension.

To achieve such an object, one aspect of the present invention provides a steering device (11) for a vehicle (1), comprising: an operation member (steering wheel 13) configured to be operated by a driver; a turning member (rack shaft 12) mechanically separated from the operation member and configured to turn a wheel (4); a turning device (turning actuator 16) configured to drive the turning member; and a controller (21) configured to control the turning device, wherein the controller has: a first control mode in which a maximum turning angle of the wheel is set to a first angle corresponding to a maximum angle for mechanically turning the wheel; and a second control mode in which the maximum turning angle of the wheel is set to a second angle that is smaller than the first angle; and the controller is configured to switch between the first control mode and the second control mode based on a current travel condition of an own vehicle detected by a travel condition detecting unit.

According to this aspect, in a travel condition where the interference between the wheel and the vehicle body side member is unlikely to occur, that is, in a travel condition where a stroke amount of a suspension does not become large, the maximum turning angle of the wheel is set to the first angle corresponding to the maximum angle for mechanically turning the wheel. Accordingly, the minimum turning radius of the vehicle becomes small, so that a tight turn characteristic of the vehicle can be acquired. On the other hand, in a travel condition where the interference between the wheel and the vehicle body side member is likely to occur, that is, in a travel condition where the stroke amount of the suspension may become large, the maximum turning angle of the wheel is limited to the second angle that is smaller than the first angle, so that the interference between the wheel and the vehicle body side member can be prevented. Accordingly, it is possible to prevent the interference between the wheel and the vehicle body side member and enhance the design flexibility of the vehicle body side member such as a suspension.

In the above aspect, preferably, the travel condition detecting unit is a vehicle speed detecting unit (vehicle speed sensor 22) configured to detect a vehicle speed as the travel condition, and the controller sets up the first control mode in a case where the vehicle speed is equal to or lower than a prescribed value, and sets up the second control mode in a case where the vehicle speed is higher than the prescribed value.

According to this aspect, the control mode can be switched appropriately based on the vehicle speed. That is, when the vehicle is traveling at low speed, the maximum turning angle is set to the first angle, so that the wheel can be turned as much as possible. Accordingly, it is possible to exert the tight turn characteristic of the vehicle when parking the vehicle or driving the vehicle on a narrow road. On the other hand, when the vehicle is traveling at high speed, the maximum turning angle is limited to the second angle, so that the wheel is prevented from being turned significantly. Accordingly, it is possible to prevent the interference between the wheel and the vehicle body side member even if a stroke amount of the suspension becomes large (even if the suspension is extended greatly) in such a situation that the wheel moves onto a step in a state where the lateral acceleration is large (for example, in a state where the vehicle is making a high-speed turn).

In the above aspect, preferably, the second angle is an angle of the wheel in a case where a slip angle of the wheel becomes equal to or larger than a prescribed threshold.

According to this aspect, in a state where the slip angle of the wheel becomes equal to or larger than the prescribed threshold, the lateral force of the vehicle does not change significantly even if the turning angle changes. Accordingly, it is desirable to prevent the wheel from being unnecessarily turned by limiting the maximum turning angle of the wheel to the second angle. Incidentally, the abovementioned threshold may be set to an angle of the wheel that corresponds to the boundary (or its vicinity) between a small slip angle area where the lateral force changes significantly depending on the slip angle and the large slip angle area where the lateral force does not change significantly depending on the slip angle.

In the above aspect, preferably, in the first control mode, in a case where the travel condition changes so as to correspond to the second control mode, the controller controls the turning device such that an actual turning angle of the wheel matches the second angle.

According to this aspect, it is possible to change the maximum turning angle to an angle suitable for the current travel condition. As a result, the wheel is turned regardless of the driver's steering operation. However, even if the actual turning angle changes to the second angle, the lateral force of the vehicle does not change significantly, and thus the behavior of the vehicle does not change significantly. Accordingly, it is possible to prevent the driver from feeling discomfort.

In the above aspect, preferably, in the travel condition corresponding to the first control mode, the controller sets the maximum turning angle to the first angle that has been corrected to decrease by a prescribed value upon detecting that the wheel moves onto a step.

According to this aspect, in a case where the stroke amount of the suspension becomes large as the wheel moves onto the step in the travel condition where the stroke amount of the suspension is unlikely to become large in a normal situation, the first angle as the maximum turning angle is corrected to decrease, so that the interference between the wheel and the vehicle body side member can be surely prevented. Incidentally, it is possible to detect that the wheel moves onto the step based on the vertical acceleration, for example.

In the above aspect, preferably, the first angle is an angle at which the wheel does not interfere with a member on a side of a vehicle body in an initial state of a suspension and the wheel interferes with the member on the side of the vehicle body in a prescribed large stroke state of the suspension, and the second angle is an angle at which the wheel does not interfere with the member on the side of the vehicle body in the large stroke state of the suspension.

According to this aspect, it is possible to acquire the tight turn characteristic by setting the maximum turning angle of the wheel to the first angle. Further, it is possible to reliably prevent the interference between the wheel and the vehicle body side member by limiting the maximum turning angle of the wheel to the second angle.

Thus, according to the above aspects, it is possible to provide a steer-by-wire steering device that can prevent the interference between the wheel and the vehicle body side member and enhance the design flexibility of the vehicle body side member such as a suspension.

BRIEF DESCRIPTION OF THE DRAWING(S)

FIG. 3 is a graph showing a lateral force characteristic of the wheel; and

FIG. 4 is a flowchart showing the procedure of maximum turning angle control performed by a controller.

DETAILED DESCRIPTION OF THE INVENTION

Hereinafter, embodiments of the present invention will be described in detail with reference to the drawings.

Figure 1:
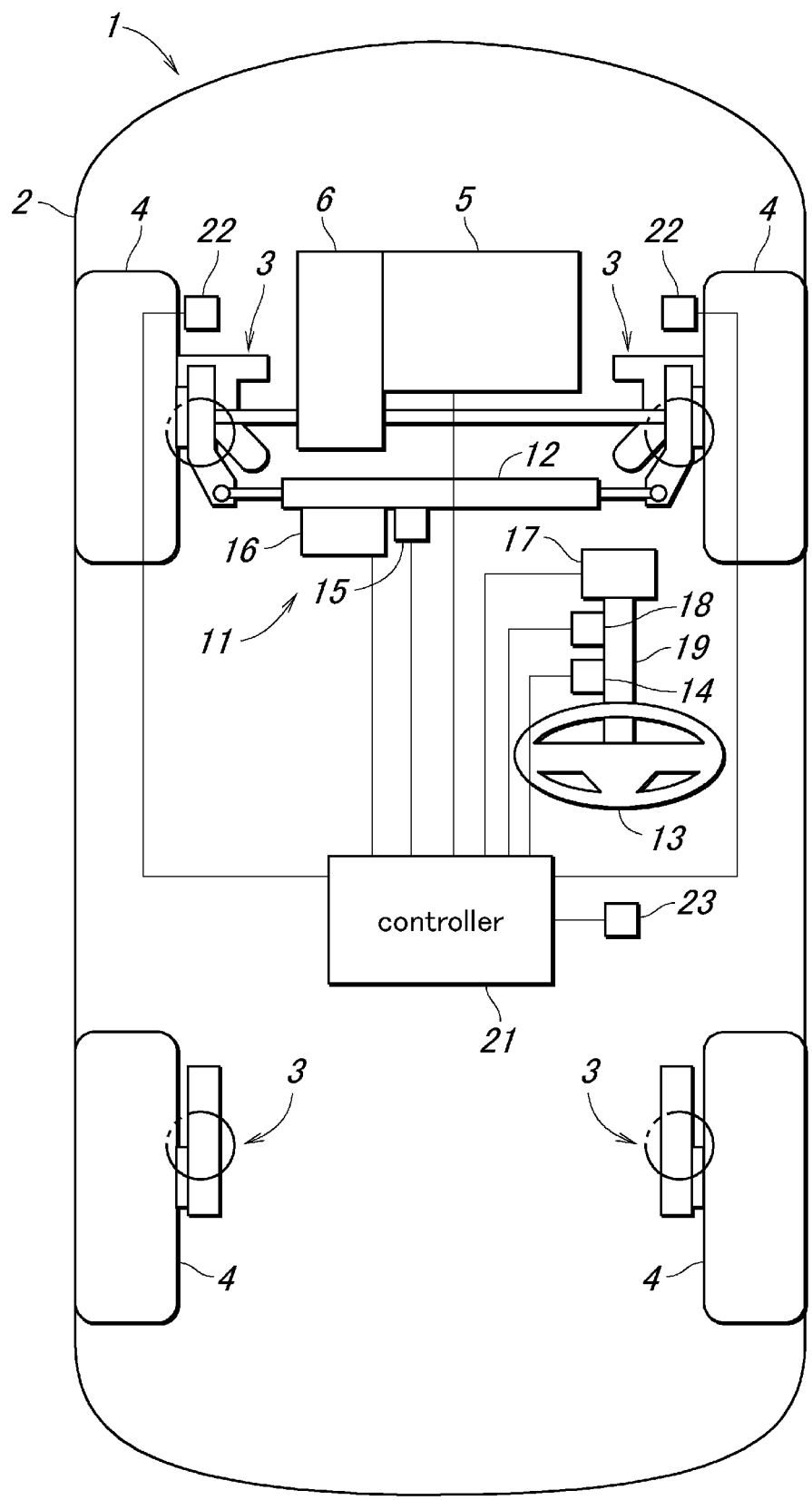
FIG. 1 is a schematic block diagram of a vehicle provided with a steering device according to the present embodiment.

FIG. 1 is a schematic block diagram of a vehicle 1 provided with a steering device 11 according to the present embodiment. As shown in FIG. 1, the vehicle 1 is a four-wheeled automobile including four wheels 4 supported by a vehicle body 2 via suspensions 3.

The vehicle 1 includes a power plant 5 (a driving device for causing the vehicle to travel) that drives the wheels 4 and a transmission 6 (transmission device) that changes a transmission mode of a driving force from the power plant 5 to the wheels 4. The power plant 5 consists of at least one of an internal combustion engine and an electric motor, and the driving force and a braking force (engine braking) of the power plant 5 are transmitted to the wheels 4. The power plant 5 is controlled according to an accelerator operation by a driver. Further, the transmission 6 is controlled according to a shift operation by the driver.

Further, the vehicle 1 includes a steer-by-wire steering device 11 that turns the wheels 4 (for example, front wheels 4). The steering device 11 includes a rack shaft 12 (turning member), a steering wheel 13 (operation member), a steering angle sensor 14, a turning angle sensor 15, a turning actuator 16 (turning device), a reaction force actuator 17 (reaction force device), and a steering torque sensor 18. Incidentally, the steering device 11 consists of the so-called shaftless steer-by-wire steering device in which the rack shaft 12 and the steering wheel 13 are not mechanically connected.

The steering wheel 13 is operated by the driver. The steering angle sensor 14 detects a steering angle of the steering wheel 13. The turning angle sensor 15 detects a turning angle of the wheels 4 (for example, the front wheels 4). The turning actuator 16 drives the rack shaft 12 by pushing or pulling the rack shaft 12, thereby turning the wheels 4. The reaction force actuator 17 applies to the steering wheel 13 a reaction force to an operation by the driver. The steering torque sensor 18 detects steering torque applied to the steering shaft 19. Incidentally, the steering torque sensor 18 may not be provided, and the steering wheel 13 may be controlled by using only a rotation angle sensor (steering angle sensor) in the reaction force actuator 17.

Further, the vehicle 1 includes a controller 21 (Electronic Control Unit: ECU), a vehicle speed sensor 22 (a driving condition detecting unit and a vehicle speed detecting unit), and an acceleration sensor 23. The controller 21 consists of a processor, memory, and the like, and controls the turning actuator 16 and the reaction force actuator 17 based on detection results of sensors such as the steering angle sensor 14, the turning angle sensor 15, the steering torque sensor 18, the vehicle speed sensor 22, and the acceleration sensor 23.

Figure 2:
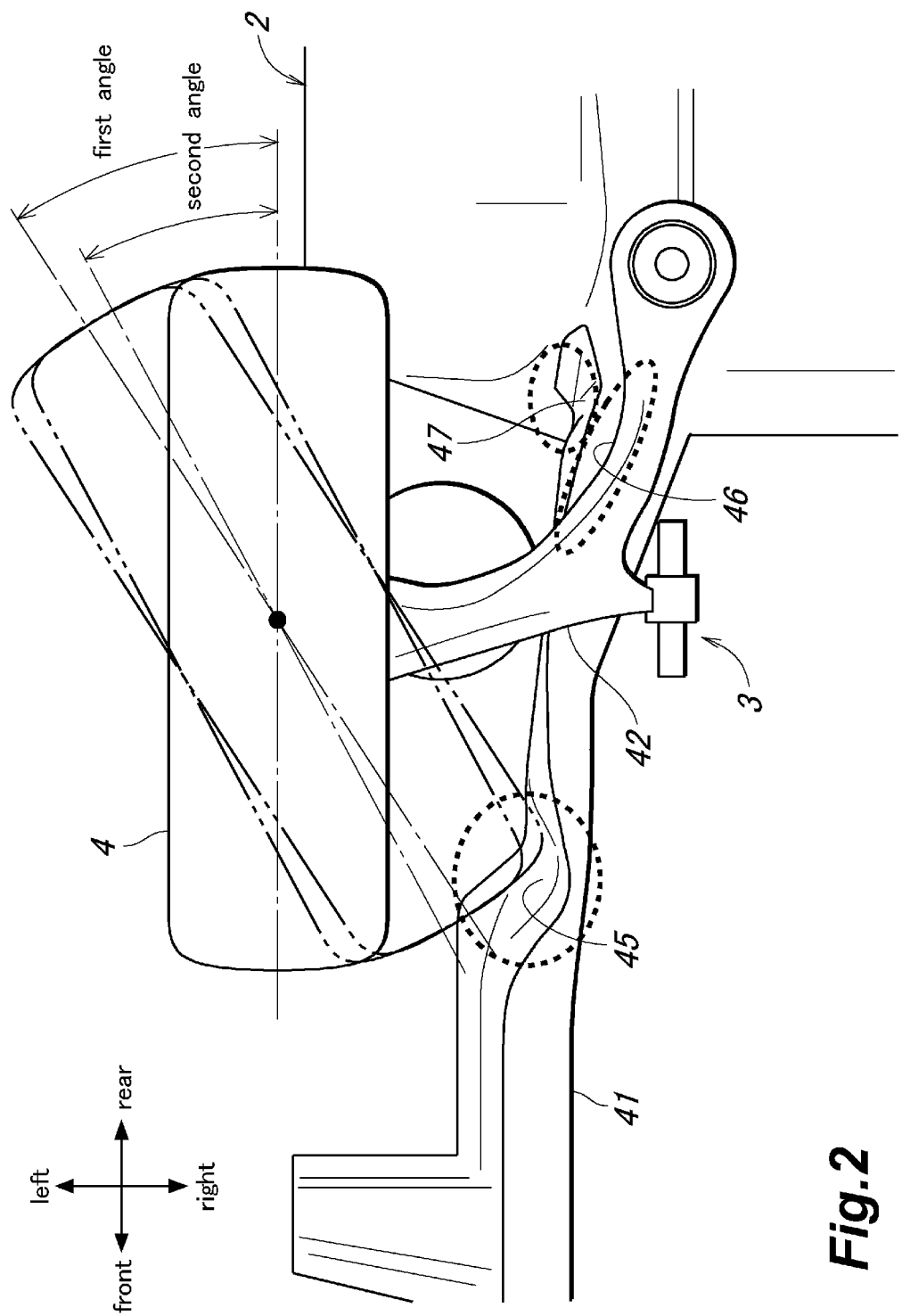
FIG. 2 is a bottom view of a vehicle body to show a turning state of a wheel.

Next, a turning state of each wheel 4 will be described. FIG. 2 is a bottom view of the vehicle body 2 to show the turning state of the wheel 4.

On left and right sides of the vehicle body 2, a pair of side frames 41 extending in the front-and-rear direction are provided. Further, each wheel 4 (hereinafter simply referred to as "the wheel 4") is supported by the vehicle body 2 via the corresponding suspension 3 (hereinafter simply referred to as "the suspension 3"). In a case where the suspension 3 goes into a large stroke state (a state where a stroke amount (stroke length) of the suspension 3 is large) in a maximum turning state of the wheel 4 (a state where the wheel 4 is turned to a maximum turning angle), the side frames 41 and a lower frame 42 of the suspension 3 each correspond to a member on a side of the vehicle body 2 (hereinafter referred to as "vehicle body side member") that may interfere with the wheel 4.

By the way, the controller 21 (see FIG. 1) has a first control mode in which the maximum turning angle of the wheel 4 is set to a first angle corresponding to a maximum angle for mechanically turning the wheel 4 and a second control mode in which the maximum turning angle of the wheel 4 is set to a second angle that is smaller than the first angle. The controller 21 performs the control to switch between the first control mode and the second control mode according to a current travel condition of the own vehicle (namely, the vehicle 1).

Incidentally, the first angle is an angle at which the wheel 4 does not interfere with the vehicle body side member in an initial state of the suspension 3 but interferes with the vehicle body side member in the prescribed large stroke state (for example, a state where the stroke amount of the suspension 3 is larger than a prescribed amount) of the suspension 3. The second angle is an angle at which the wheel 4 does not interfere with the vehicle body side member in the large stroke state of the suspension 3.

Accordingly, in a travel condition where the interference between the wheel 4 and the vehicle body side member is unlikely to occur, that is, in a travel condition where the stroke amount of the suspension 3 does not become large, the maximum turning angle of the wheel 4 is set to the first angle corresponding to the maximum angle for mechanically turning the wheel 4. Accordingly, the minimum turning radius of the vehicle 1 becomes small, so that a tight turn characteristic of the vehicle 1 can be acquired.

On the other hand, in a travel condition where the interference between the wheel 4 and the vehicle body side member is likely to occur, that is, in a travel condition where the stroke amount of the suspension 3 may become large, the maximum turning angle of the wheel 4 is limited to the second angle that is smaller than the first angle, so that the interference between the wheel 4 and the vehicle body side member can be prevented.

In the example shown in FIG. 2, two recesses 45 and 47 are formed on the side frame 41, and a recess 46 is formed on the lower frame 42 of the suspension 3. These recesses 45, 46, 47 may be formed if the maximum turning angle is not limited to the second angle in the travel condition where the interference between the wheel 4 and the vehicle body side member is likely to occur. If such recesses 45, 46, 47 are present, tight restrictions are imposed on the cross-sectional shapes of the side frame 41 and the lower frame 42, which may reduce the design flexibility of the side frame 41 and the lower frame 42.

By contrast, in the present embodiment, the maximum turning angle is limited to the second angle in the travel condition where the interference between the wheel 4 and the vehicle body side member is likely to occur. Accordingly, it is not necessary to provide the recesses 45, 46, 47, or it is possible to reduce the depth of the recesses 45, 46, 47. That is, in the abovementioned configuration, the wheel 4 may interfere with the vehicle body side member if the suspension 3 goes into the large stroke state in a state where the wheel 4 is in the first angle corresponding to the maximum angle for mechanically turning the wheel 4. Even if such a configuration is adopted, it is possible to prevent the wheel 4 from interfering with the vehicle body side member by controlling the wheel 4 so as to be turned only up to the second angle smaller than the first angle in the travel condition where the suspension 3 may become the large stroke state.

Accordingly, it is possible to prevent the interference between the wheel 4 and the vehicle body side member and enhance the design flexibility of the vehicle body side member such as the side frame 41 and the suspension 3. Accordingly, it is possible to reduce the weight of the vehicle body side member by rationalizing the structure thereof (for example, by securing the cross-sectional area thereof). Further, it is possible to reduce the minimum turning radius of the vehicle 1 and thus enhance the tight turn characteristic thereof by increasing the maximum turning angle without significantly changing the shape of the vehicle body side member.

Next, the second angle set to the maximum turning angle in the second control mode will be described. FIG. 3 is a graph showing a lateral force characteristic of the wheel 4, namely, a changing characteristic of the lateral force according to the slip angle of the wheel 4. Hereinafter, "the lateral force" means an absolute value of the lateral force, and "the slip angle" means an absolute value of the slip angle.

The lateral force is generated according to the slip angle caused by turning of the wheel 4. At this time, in small slip angle areas where the slip angle is relatively small, the lateral force increases as the wheel 4 is turned and the slip angle becomes large accordingly. By contrast, in large slip angle areas where the slip angle is relatively large, the lateral force hardly changes even if the wheel 4 is turned and the slip angle becomes large accordingly. For example, in a case where the wheel 4 is turned significantly in a middle speed range or a high-speed range, the lateral force hardly changes even if the slip angle becomes large.

In the present embodiment, the second angle, which is set to the maximum turning angle in the second control mode, is set to an angle of the wheel 4 that corresponds to the slip angle to be a boundary value between each small slip angle area where the lateral force changes significantly depending on the slip angle and each large slip angle area where the lateral force does not change significantly depending on the slip angle.

Accordingly, the lateral force hardly changes even if the wheel 4 is turned beyond the second angle, and thus turning of the wheel 4 beyond the second angle becomes invalid. Accordingly, it is possible to prevent the wheel 4 from being unnecessarily turned by limiting the maximum turning angle of the wheel 4 to the second angle.

In the present embodiment, the second angle to be the maximum turning angle in the second control mode is set by using a turning angle limitation map. In this turning angle limitation map, the second angle can be acquired based on the vehicle speed detected by the vehicle speed sensor 22 and the turning angle detected by the turning angle sensor 15.

Incidentally, the slip angle can be detected (estimated) based on the vehicle speed and the turning angle. Accordingly, the second angle, namely, the angle of the wheel 4 that corresponds to the slip angle to be the boundary value between the small slip angle area and the large slip angle area can be set based on the vehicle speed and the turning angle.

Incidentally, the lateral force can be estimated based on the lateral acceleration detected by the acceleration sensor 23. Accordingly, the second angle may be set based on the lateral acceleration detected by the acceleration sensor 23. Further, in a case where the stroke amount of the suspension 3 can be detected (for example, in a case where a variable damper whose damping force can be controlled is used), the second angle may be set based on the stroke amount thereof.

Next, the procedure of maximum turning angle control performed by the controller 21 will be described. FIG. 4 is a flowchart showing the procedure of the maximum turning angle control.

First, the controller 21 determines whether the vehicle speed is equal to or less than a prescribed value (step ST1).

In a case where the vehicle speed is equal to or lower than the prescribed value (ST1: Yes), the controller 21 sets up (selects) the first control mode (step ST2).

Next, the controller 21 determines whether the wheel 4 moves onto a step (a curb, or the like) according to whether the vertical acceleration is equal to or less than a prescribed value (step ST3). Incidentally, information on the step may be acquired from a system that detects an obstacle in front of the vehicle 1 by using a sensor and a camera, and thus the movement of the wheel 4 onto the step may be detected based on the information on the step. Alternatively, the movement of the wheel 4 onto the step may be detected based on the stroke amount of the suspension 3.

In a case where the vertical acceleration is equal to or less than the prescribed value, that is, in a case where the wheel 4 does not move onto the step (ST3: Yes), the controller 21 sets the maximum turning angle to the first angle (step ST4).

On the other hand, in a case where the vertical acceleration is more than the prescribed value, that is, in a case where the controller 21 detects that the wheel 4 moves onto the step (ST3: No), the controller 21 corrects the first angle by decreasing the first angle by a prescribed value (ST5). Then, the controller 21 sets the maximum turning angle to the corrected first angle (step ST4). The correction range of the first angle may be set to a constant as appropriate, or may be set (changed) based on the magnitude of the vertical acceleration and the like.

Further, in a case where the vehicle speed is higher than the prescribed value (ST1: No), the controller 21 sets up (selects) the second control mode (step ST6). Next, the controller 21 acquires the second angle based on the turning angle limitation map (step ST7). Next, the controller 21 sets the maximum turning angle to the second angle (step ST8).

Thus, in the present embodiment, in a case where the vehicle speed is equal to or lower than the prescribed value, the maximum turning angle is set to the first angle in the first control mode. On the other hand, in a case where the vehicle speed is higher than the prescribed value, the maximum turning angle is set to the second angle in the second control mode. Accordingly, when the vehicle 1 is traveling at low speed, the maximum turning angle is set to the first angle, so that the wheel 4 can be turned as much as possible. Accordingly, it is possible to exert the tight turn characteristic of the vehicle 1 when parking the vehicle 1 or driving the vehicle 1 on a narrow road. On the other hand, when the vehicle 1 is traveling at high speed, the maximum turning angle is limited to the second angle, so that the wheel 4 is prevented from being turned significantly. Accordingly, it is possible to prevent the interference between the wheel 4 and the vehicle body side member even if a stroke amount of the suspension 3 becomes large (even if the suspension 3 is extended greatly) in such a situation that the wheel 4 moves onto the step in a state where the lateral acceleration is large (for example, in a state where the vehicle 1 is making a high-speed turn).

Further, in the present embodiment, in the travel condition corresponding to the first control mode, the controller 21 sets the maximum turning angle to the first angle that has been corrected to decrease by the prescribed value upon detecting that the wheel 4 moves onto the step. Accordingly, in a case where the stroke amount of the suspension 3 becomes large as the wheel 4 moves onto the step in the travel condition where the stroke amount of the suspension 3 is unlikely to become large in a normal situation, the first angle as the maximum turning angle is corrected to decrease, so that the interference between the wheel 4 and the vehicle body side member can be surely prevented.

Incidentally, in a case where the actual turning angle of the wheel 4 is closer to the original first angle than the corrected first angle, the maximum turning angle may be set to the first angle and the turning actuator 16 may be controlled such that the actual turning angle of the wheel 4 matches the first angle so as to forcibly change the actual turning angle of the wheel 4 to the first angle.

Further, in the present embodiment, in a case where the controller 21 transitions from the first control mode to the second control mode as the vehicle 1 accelerates and thus the vehicle speed increases, the maximum turning angle changes from the first angle to the second angle. At this time, the actual turning angle of the wheel 4 may be in a range between the first angle and the second angle. For example, in a case where the vehicle 1 accelerates in the maximum turning state of the wheel 4, the controller 21 transitions from the first control mode to the second control mode and thus the maximum turning angle switches from the first angle to the second angle in a state where the actual turning angle of the wheel 4 is in the range between the first angle and the second angle.

In such a case, the controller 21 controls the turning actuator 16 such that the actual turning angle of the wheel 4 matches the second angle, and thus the actual turning angle of the wheel 4 is forcibly changed to the second angle. Accordingly, it is possible to change the maximum turning angle to an angle suitable for the current travel condition.

On the other hand, when the actual turning angle of the wheel 4 is forcibly changed to the second angle in this way, the wheel 4 is turned regardless of the driver's steering operation. However, at this time, the actual turning angle of the wheel 4 is in the range between the first angle and the second angle. That is, the slip angle of the wheel 4 is in the large slip angle area where the lateral force does not change significantly according to the slip angle. Accordingly, even if the actual turning angle is forcibly changed to the second angle, the lateral force of the vehicle 1 does not change significantly, and thus the behavior of the vehicle 1 does not change significantly. Accordingly, it is possible to prevent the driver from feeling discomfort.

Further, in a case where the controller 21 switches from the first control mode to the second control mode and the maximum turning angle changes from the first angle to the second angle, the maximum turning angle may gradually change from the first angle to the second angle, and thus the actual turning angle of the wheel 4 may gradually change to the second angle. Accordingly, it is possible to suppress a change in the behavior of the vehicle 1 and reduce the discomfort felt by the driver.

By the way, in the present embodiment, the vehicle speed is set as the travel condition to be a criterion for switching between the first control mode and the second control mode, and whether the vehicle speed is equal to or lower than the prescribed value is determined in step ST1 of FIG. 4. However, the travel condition to be the criterion for switching the control modes is not limited to the vehicle speed. For example, the lateral acceleration detected by the acceleration sensor 23, the stroke amount of the suspension 3 detected by using a variable damper whose damping force can be controlled, the information output from a system that detects an obstacle in front of the vehicle 1 by using a sensor and a camera, or the like may be set to the travel condition to be the criterion for switching the control modes.

Concrete embodiments of the present invention have been described in the foregoing, but the present invention should not be limited by the foregoing embodiments and various modifications and alterations are possible. For example, the specific configuration, arrangement, quantity, angle, procedure, or the like of each member and each portion may be appropriately changed within the scope of the present invention. Also, not all of the structural elements shown in the above embodiments are necessarily indispensable and they may be selectively adopted as appropriate.

The invention claimed is:

1. A steering device for a vehicle, comprising:
an operation member configured to be operated by a driver;
a turning member mechanically separated from the operation member and configured to turn a wheel;
a turning device configured to drive the turning member; and
a controller configured to control the turning device, wherein the controller has:
a first control mode in which a maximum turning angle of the wheel is set to a first angle corresponding to a maximum angle for mechanically turning the wheel; and
a second control mode in which the maximum turning angle of the wheel is set to a second angle that is smaller than the first angle; and
the controller is configured to switch between the first control mode and the second control mode based on a current travel condition of an own vehicle detected by a travel condition detecting unit,
wherein in the travel condition corresponding to the first control mode, the controller sets the maximum turning angle to the first angle that has been corrected to decrease by a prescribed value in response to detecting that the wheel moves onto a step,
wherein in a case where the controller transitions from the first control mode to the second control mode in response to detecting an actual turning angle of the wheel between the first angle and the second angle, the controller forcibly changes the actual turning angle of the wheel to the second angle.

2. The steering device according to claim 1, wherein the travel condition detecting unit is a vehicle speed detecting unit configured to detect a vehicle speed as the travel condition, and
the controller sets up the first control mode in a case where the vehicle speed is equal to or lower than a prescribed value, and sets up the second control mode in a case where the vehicle speed is higher than the prescribed value.

3. The steering device according to claim 1, wherein the second angle is an angle of the wheel in a case where a slip angle of the wheel becomes equal to or larger than a prescribed threshold.

4. The steering device according to claim 3, wherein in the first control mode, in a case where the travel condition changes so as to correspond to the second control mode, the controller controls the turning device such that the actual turning angle of the wheel matches the second angle.

5. A steering device for a vehicle, comprising:
an operation member configured to be operated by a driver;
a turning member mechanically separated from the operation member and configured to turn a wheel;
a turning device configured to drive the turning member; and
a controller configured to control the turning device, wherein the controller has:
a first control mode in which a maximum turning angle of the wheel is set to a first angle corresponding to a maximum angle for mechanically turning the wheel; and
a second control mode in which the maximum turning angle of the wheel is set to a second angle that is smaller than the first angle; and
the controller is configured to switch between the first control mode and the second control mode based on a current travel condition of an own vehicle detected by a travel condition detecting unit,
wherein the first angle is an angle at which the wheel does not interfere with a side frame of a vehicle body in an initial state of a suspension and the wheel interferes with the member on the side frame of the vehicle body in a prescribed large stroke state of the suspension, and the second angle is an angle at which the wheel does not interfere with the side frame of the vehicle body in the large stroke state of the suspension,
wherein in a case where the controller transitions from the first control mode to the second control mode in response to detecting an actual turning angle of the wheel between the first angle and the second angle, the controller forcibly changes the actual turning angle of the wheel to the second angle.

* * * * *